United States Patent [19]
Lehman

[11] Patent Number: 5,941,056
[45] Date of Patent: Aug. 24, 1999

[54] DISC MOWER WITH DRIVE BELT TIGHTNESS INDICATOR

[75] Inventor: Barry E. Lehman, York, Pa.

[73] Assignee: New Holland North America, Inc., New Holland, Pa.

[21] Appl. No.: 09/073,028

[22] Filed: May 7, 1998

Related U.S. Application Data

[62] Division of application No. 08/673,605, Jun. 25, 1996, Pat. No. 5,761,890
[60] Provisional application No. 60/000,818, Jun. 26, 1995.

[51] Int. Cl.[6] .................................................. A01D 34/66

[52] U.S. Cl. .............................. 56/11.6; 56/6; 56/DIG. 22

[58] Field of Search ............................... 56/6, 13.6, 295, 56/11.9, 11.6, 15.9, 16.2, 192, 195, DIG. 22; 474/135, 101; 180/53.1; 172/15

[56] References Cited

U.S. PATENT DOCUMENTS

| | | | |
|---|---|---|---|
| 4,640,378 | 2/1987 | Dobberpuhl et al. | 180/53.1 |
| 4,864,806 | 9/1989 | Mijnders | 56/61 X |
| 5,199,502 | 4/1993 | Hirata et al. | 172/15 |
| 5,353,580 | 10/1994 | Wolff | 56/6 X |

*Primary Examiner*—Robert Pezzuto
*Attorney, Agent, or Firm*—Larry W. Miller; J. William Stader; Frank A. Seemar

[57] ABSTRACT

A disc mower incorporates a modular disc cutterbar. The drive mechanism for the mower utilizes a V-belt drive apparatus that requires proper tensioning which is accomplished through a spring tensioning mechanism that includes an indicator to visually determine when the proper tension has been applied. The indicator includes a bracket positioned adjacent the spring and has a length substantially equal to the length of the spring required for exerting the proper spring force for tensioning the drive belt.

6 Claims, 11 Drawing Sheets

DISC MOWER WITH DRIVE BELT TIGHTNESS INDICATOR

CROSS-REFERENCE TO RELATED APPLICATIONS

This application is a division of U.S. patent application Ser. No. 08/673,605, filed Jun. 25, 1996, now U.S. Pat. No. 5,761,890, claiming benefit from U.S. Provisional Patent Application Serial No. 60/000,818, filed Jun. 26, 1995.

BACKGROUND OF THE INVENTION

This invention relates generally to an apparatus for mowing standing crop material and, more particularly, to a mower mounted to the three-point hitch of a tractor and carrying a modular disc cutterbar that severs standing crop material by impact action.

Disc cutterbars have been utilized in agricultural harvesting implements for many years. Each disc cutterbar includes a plurality of transversely spaced disc cutters driven for rotation about a generally vertical axis. Each disc cutter has two or three knives pivotally mounted on the periphery thereof to sever standing crop from the ground through an impact action. For background information on the structure and operation of disc cutterbars, reference is made to U.S. Pat. No. 4,815,262, issued to E. E. Koch and F. F. Voler, the descriptive portions thereof being incorporated herein by reference.

The construction of disc cutterbars has evolved over the years to the configuration of having a modular construction with cutter modules and spacer modules, such as shown in U.S. Pat. No. 4,840,019, issued to L. J. Pingry, the descriptive portions of which are incorporated herein by reference. In some instances, the cutter modules and the spacer modules were integrally formed into one unit such as shown and described in U.S. Pat. No. 4,947,629, issued to R. Ermacora and H. Neuerburg.

A disc mower is typically mounted to the three-point hitch of the tractor providing the source of operative power thereto. The driven components of the disc cutterbar are operatively connected through a conventional drive mechanism to the power-takeoff shaft of the tractor or, possibly to a hydraulic drive mechanism powered from the tractor. The disc mower is provided with a base frame that may be supported from the tractor three-point hitch. The disc cutterbar is pivotally supported from the base frame to be movable between a raised transport position, in which the cutterbar may be generally vertically oriented, and a lowered operative position in which the cutterbar is riding on the ground to sever standing crop material through operation of the rotating disc members and affixed cutting knives.

When the disc cutterbar is lowered to the operative position, there is a need to provide a mechanism at the distal end of the cutterbar to keep objects away from the rotating end disc member.

The drive mechanism between the tractor power-takeoff shaft and the driven components of the disc cutterbar typically include a friction drive apparatus, such as a multi-stranded V-belt entrained around a drive sheave and a driven sheave without the benefit of a spring-loaded idler sheave to keep proper tension in the V-belt. Ensuring that the V-belt is operating at the correct tension is difficult to determine. One known method of determining the proper tension is to measure the deflection of each V-belt at the mid-span with a given perpendicular force. Typically, the operator will merely feel the V-belt as the tension stud nut is torqued to increase the tension in the V-belt. Accordingly, an improved method and apparatus for properly tensioning the V-belt needs to be provided. Preferably, the tensioning of the V-belt would not require the removal of the shielding member or the addition of holes in the shielding member to measure the V-belt deflection.

V-belt tension will decrease from an initial setting due to stretching of the belt and from wearing of the belt over time. The result is that the initial tension setting of a V-belt will lessen over time, which unless corrected will result in belt slippage and excessive wear. On the other hand an over-tensioning the V-belt will result in premature failure of the V-belt, as well as overload of other drive components, such as drive shafts and bearings.

The flotation of the disc cutterbar on the surface of the ground when in the operative position is provided by a flotation spring mechanism interconnecting the base frame of the mower and the support frame for the disc cutterbar. In a preferred embodiment of the disc mower, the flotation spring mechanism needs to be disengaged before the disc mower is removed from its mounting on the tractor. The failure to disengage the flotation spring mechanism to eliminate the spring force exerted thereby will result in a rotation of the disc mower base frame laterally when the lower lift arms of the tractor are disconnected from the three-point hitch pins of the mower.

SUMMARY OF THE INVENTION

It is an object of this invention to provide disc mower improvements that overcome the aforementioned disadvantages of the prior art.

It is another object of this invention to provide an apparatus for assuring the proper tensioning of the V-belt drive mechanism.

It is a feature of this invention that the V-belt drive tensioning apparatus utilizes a spring coupled with an indicator to provide a visual indication of the correct spring length for tensioning the drive apparatus.

It is an advantage of this invention that the life of the V-belt drive apparatus is maximized.

It is still another object of this invention to provide a guard on the distal end of the disc mower to keep objects away from the end of the disc cutterbar without impairing the operation of the cutterbar.

It is another feature of this invention that the cutterbar guard forms an extension of the cutterbar canopy support.

It is still another feature of this invention that the cutterbar guard is split to permit the canopy to be folded back for access to the disc cutterbar.

It is yet another feature of this invention that the leading edge of the guard extends forwardly of the leading edge of the canopy to deflect objects from the edge of the canopy.

It is another advantage of this invention that the guard presents no gaps that can catch viney crops, tree saplings, and other objects.

It is still another advantage of this invention that the guard protects the distal end of the canopy structure from wear.

It is yet another object of this invention to provide a mechanism to assure the disengagement of the flotation springs before the mower can be dismounted from the tractor three-point hitch.

It is a further feature of this invention that the support jack is tethered to the mower from the pin that engages the flotation springs.

It is yet another advantage of this invention that the support jack cannot be installed unless the pin engaging the flotation spring is removed.

It is a further advantage of this invention that the spring force suspending the cutterbar from the mower frame must be disengaged before the mower can be dismounted from the tractor three-point hitch.

It is a further object of this invention to provide a disc mower which is durable in construction, inexpensive of manufacture, carefree of maintenance, facile in assemblage, and simple and effective in use.

These and other objects, features and advantages are accomplished according to the instant invention by providing a disc mower incorporating a modular disc cutterbar. The drive mechanism for the mower utilizes a V-belt drive apparatus that requires proper tensioning which is accomplished through a spring tensioning mechanism that includes an indicator to visually determine when the proper tension has been applied. A split guard is mounted to the distal end of the mower canopy to keep objects away from the end of the disc cutterbar. The guard presents a smooth contiguous surface to prevent debris and crop material from catching the guard. The flotation mechanism supporting the cutterbar from the mower frame must be disconnected before the mower is dismounted from the tractor three-point hitch. The support jack is tethered to the mower frame from the pin engaging the flotation mechanism, requiring the pin to be removed to install the support jack.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
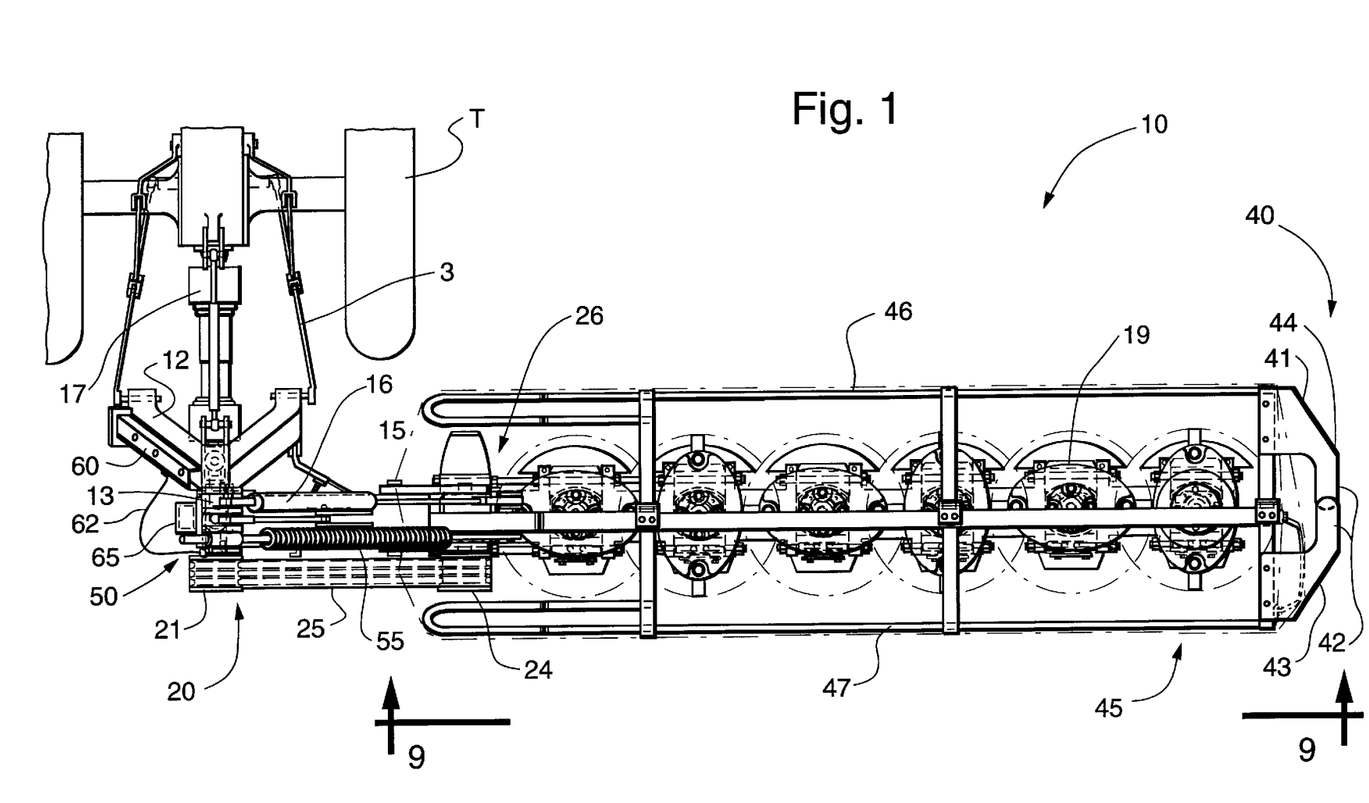
FIG. 1 is a top plan view of a disc mower incorporating the principles of the instant invention, the mower is mounted to the three-point hitch of a representative tractor, the mower canopy being broken away for purposes of clarity.
Figure 2:
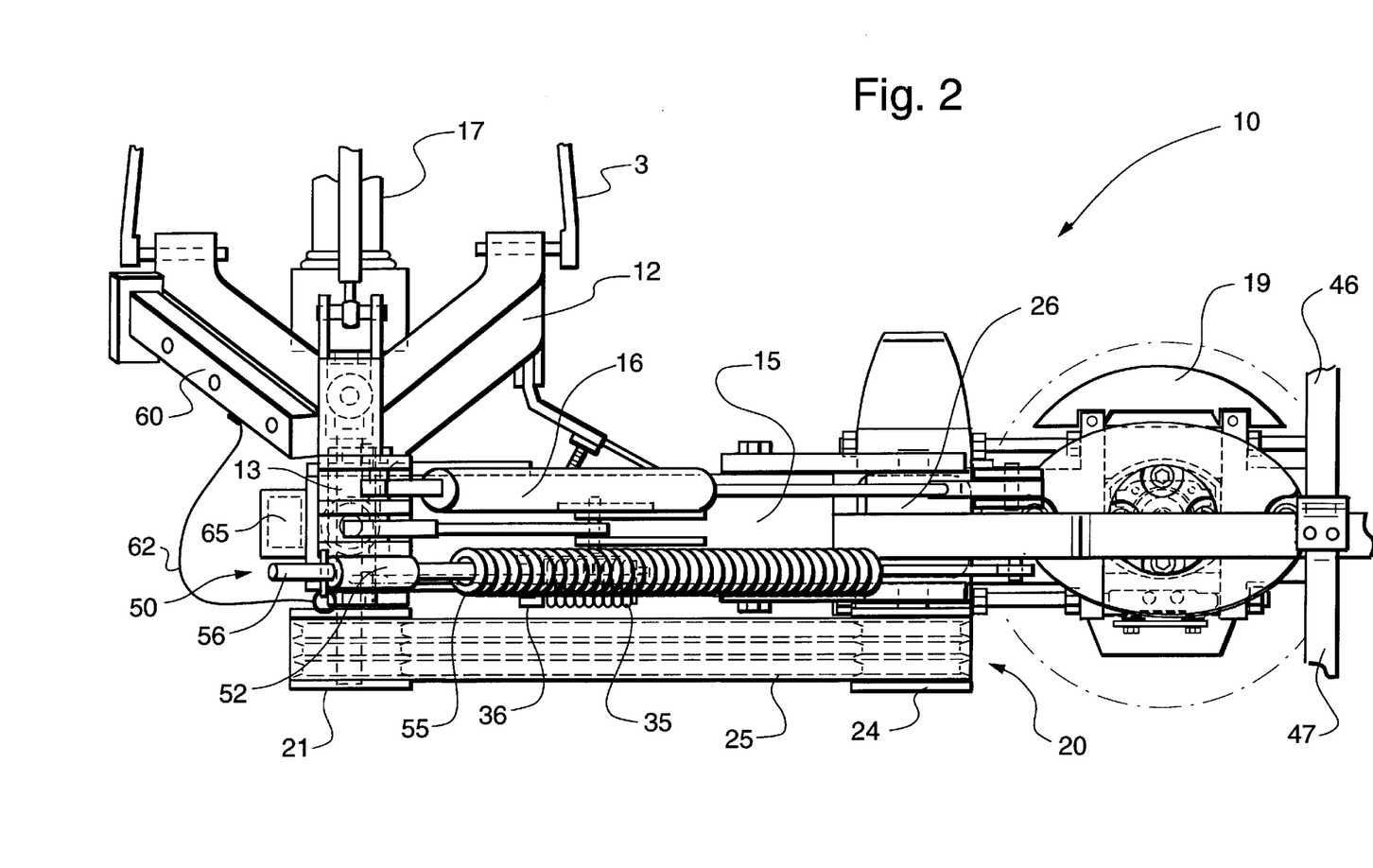
FIG. 2 is an enlarged partial top plan view of the mower shown in FIG. 1 to depict the drive mechanism.
Figure 3:
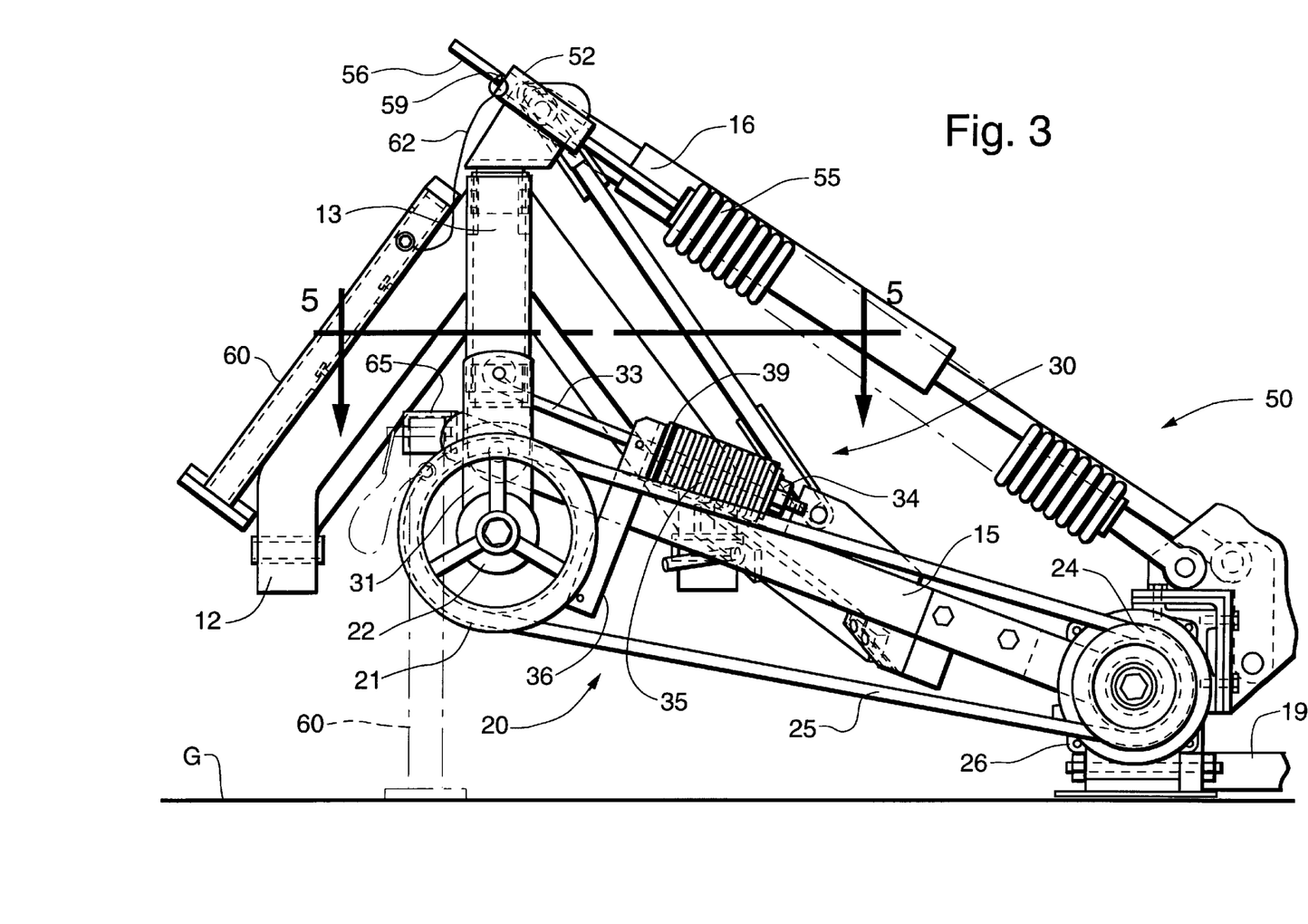
FIG. 3 is a partial elevational view of the disc mower as seen in FIG. 2, the support position of the jack stand being shown in phantom.
Figure 4:
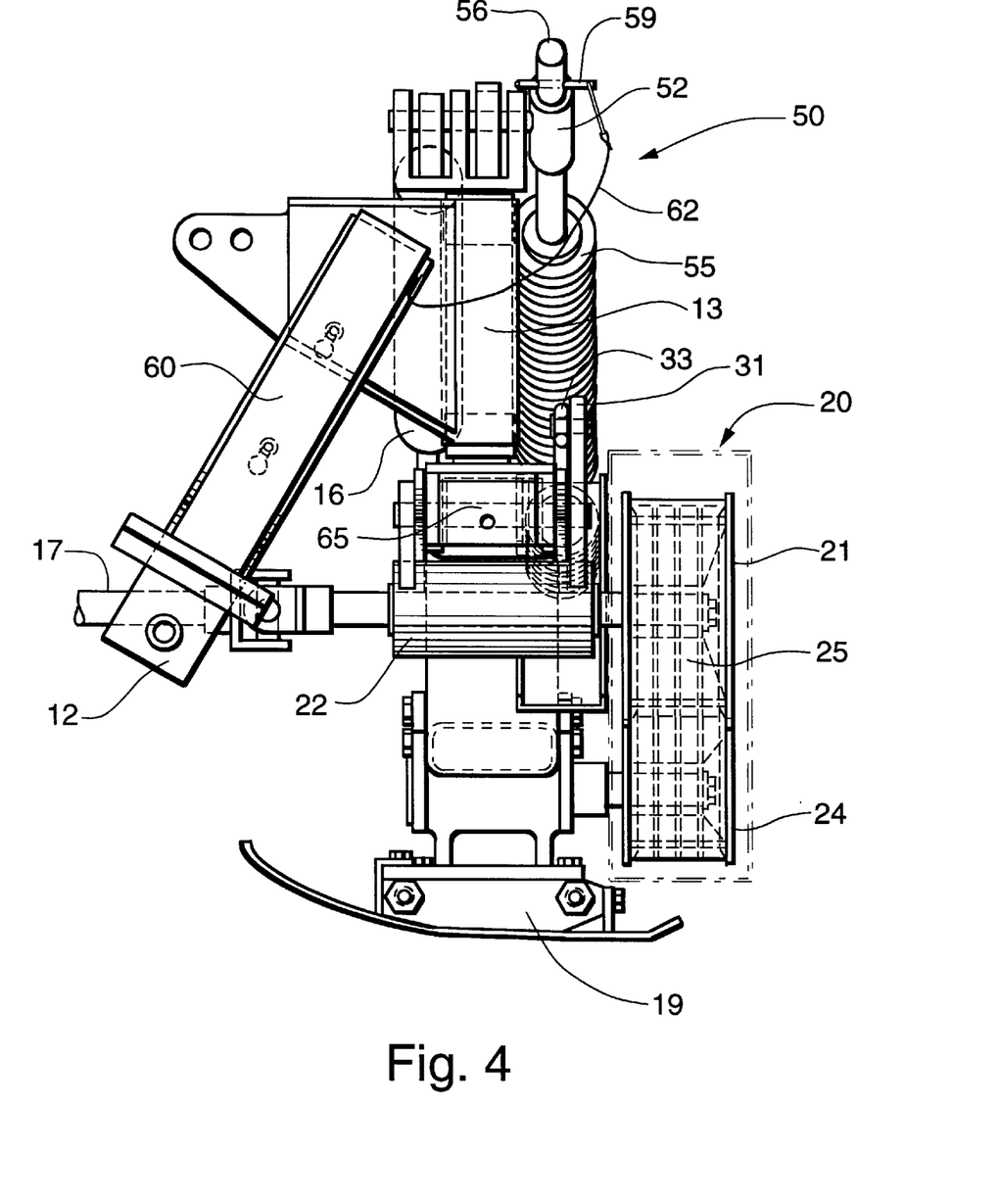
FIG. 4 is a left end view of the disc mower as shown in FIG. 3, the shielding surrounding the V-belt drive apparatus being shown in phantom.

Referring now to the drawings and, particularly, to FIGS. 1 and 2, the disc mower 10 utilizing a modular disc cutterbar and incorporating the principles of the instant invention can best be seen. Left and right references are used as a matter of convenience and are determined by standing at the rear of the machine facing forwardly into the normal direction of travel.

The disc mower 10 is mounted in a conventional manner to the three-point hitch 3 of a tractor T to be operable outboard to the right of the tractor T. The mower 10 includes a triangular mounting frame member 12 adapted to connect to the three-point hitch mechanism 3 and an integral base frame 13 to support the cutterbar 19 and the drive mechanism 20. The mower also includes a support frame 15 pivotally connected to the base frame 13, as will be described in greater detail below, for supporting the disc cutterbar 19 for pivotal movement between a raised transport position and a lowered, ground-engaging, operative position. The support frame 15 also supports a protective canopy 45 encircling the disc cutterbar 19.

The V-belt drive mechanism 20 is operably powered from a power-takeoff (PTO) shaft 17 transferring rotational power from the tractor T in a conventional manner. A drive pulley 21 is supported in a cantilevered fashion from a main bearing 22 and is powered directly from the PTO shaft 17. A driven pulley 24 transfers rotational power into a gearbox 26, which in turn provides operative driving power for the disc cutterbar 19, as is described in co-pending U. S. patent application Ser. No. 08/673,604, entitled "Disc Cutterbar for Agricultural Implements" and filed concurrently herewith, the descriptive portions of which are incorporated herein by reference. An endless V-belt 25 entrains the drive pulley 21 and the driven pulley 24 to transfer rotational power therebetween.

Figure 5:
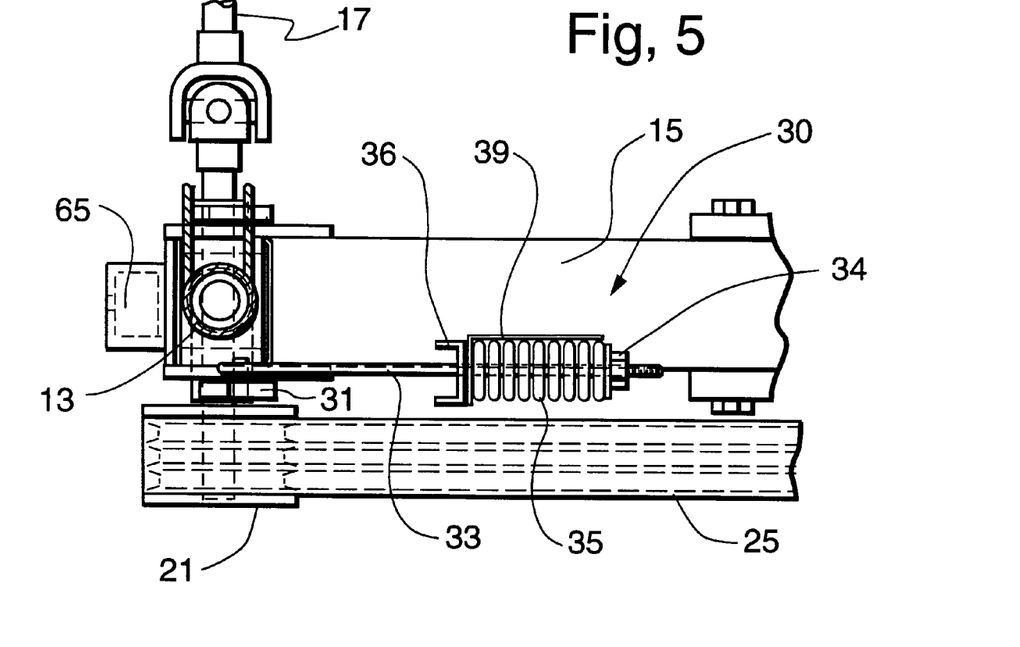
FIG. 5 is a partial cross-sectional view of the disc mower corresponding to lines 5—5 of FIG. 3 to depict a top plan view of the spring tensioning mechanism for the V-belt drive apparatus.
Figure 6:
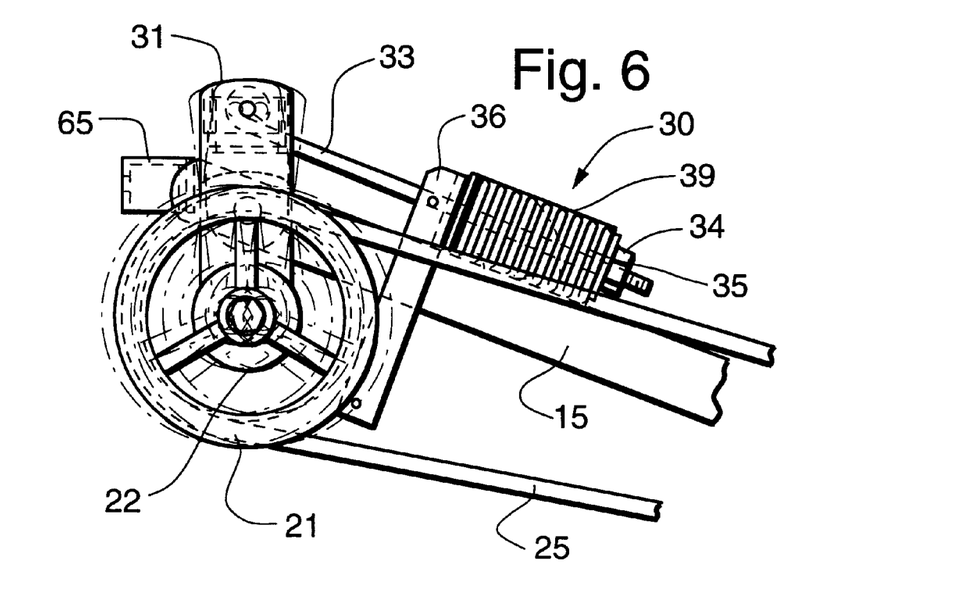
FIG. 6 is a rear elevational view of the spring tensioning mechanism shown in FIG. 5.
Figure 7:
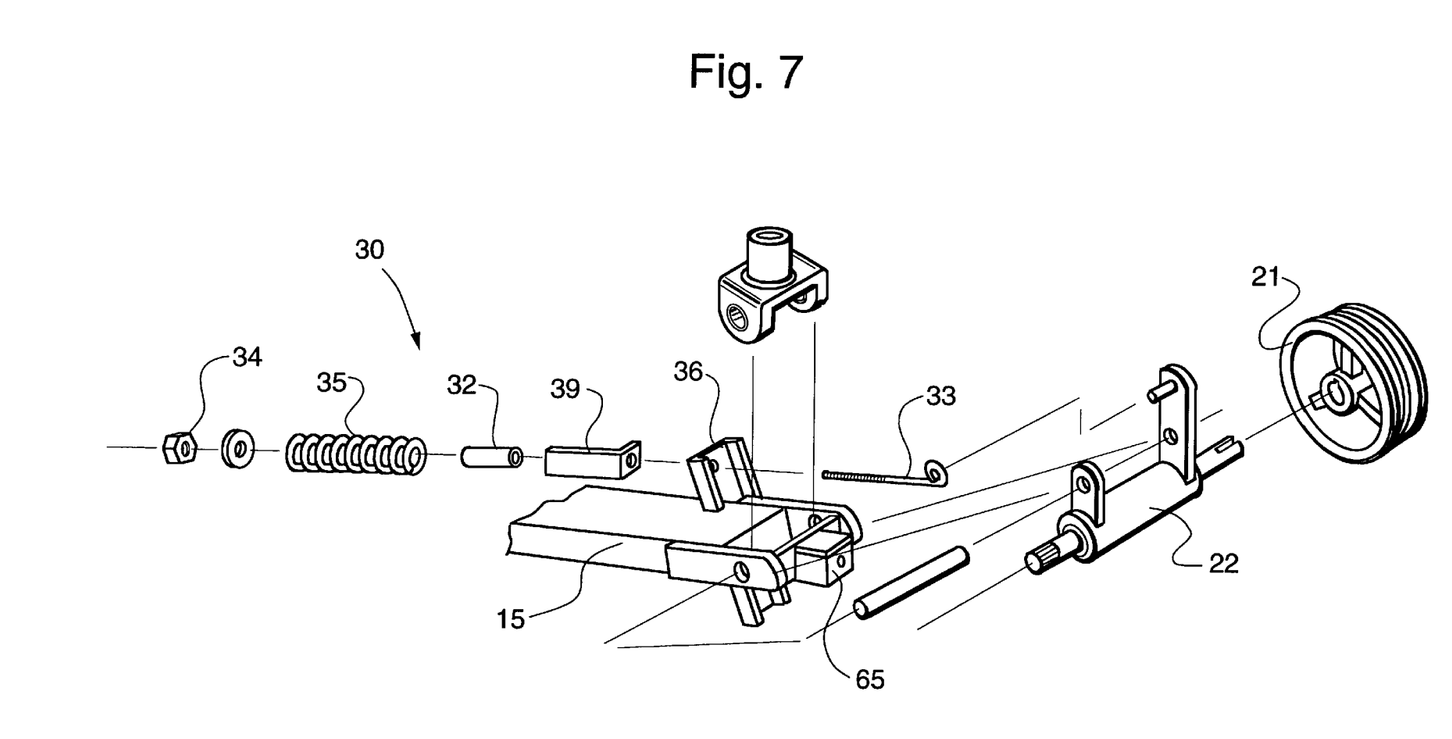
FIG. 7 is an exploded view of the spring tensioning mechanism.

The V-belt 25 must be properly tensioned to maximize life of the belt 25 and the associated supporting structure, such as the bearing 22 and gearbox 26. To provide proper tension, a spring tensioning mechanism 30 is operably connected to the drive pulley 21 to vary the distance relative to the driven pulley 24. The tensioning mechanism 30 includes a pivot member 31 pivotally connected to the base frame 13 for support of the drive pulley 21 at one end thereof. The opposing end of the pivot member 31 is connected to a tensioning rod 33 to effect pivotal movement of the pivot member 31 and a corresponding movement of the drive pulley 21.

The tensioning rod 33 is spring-loaded by a spring 35, properly positioned on the tensioning rod 33 by a spacer 32, to urge the drive pulley 21 away from the driven pulley 24 and, thereby, apply tension in the V-belt 25. The spring 35 pushes against a support bracket 36 affixed to the base frame 13. An adjustment nut 34 threaded onto the tensioning rod 33 is effective to compress the spring 35 against the support bracket 36 and, thereby, draw the tensioning rod 33 to apply greater tension to the belt 25. An L-shaped bracket 39 is affixed to the support bracket 36 and extends along the spring 35 to terminate at a location corresponding to the correct spring length for applying the proper tension on the belt 35.

In operation, the tension is varied in the V-belt 25 by manipulating the adjustment nut 34 on the tensioning rod 33 and, thereby, effect a pivotal movement of the pivot member 31. The operator can determine the proper tension to be applied to the belt 25 by compressing the spring 35 until the length of the spring 35 equals the length of the indicator bracket 39 positioned adjacent the spring 35. The spring 35 is designed to maintain the adequate tension in the V-belt 25 during the initial stretch of the V-belt 25 so that the operator will not be inconvenienced by having to tighten the V-belt 25 during the initial use period. Tension can be adjusted at normal service intervals.

Referring now to FIGS. 1 and 8–12, the details of the cutterbar guard 40 can best be seen. The guard 40 is mounted on the distal end of the canopy support 46, 47 from which the canopy 45 is hung to prevent objects from coming laterally into the remote end of the disc cutterbar 19. This guard 40 consists of a pair of sheet metal stampings 41, 43. One of the stampings 41 is bolted to the outboard end of the front canopy support 46, which is mounted to swing rearwardly to expose the cutterbar 19 for access thereto, while the other identical stamping 43 is bolted to the outboard end of the rear stationary rear canopy support 47.

Figure 11:
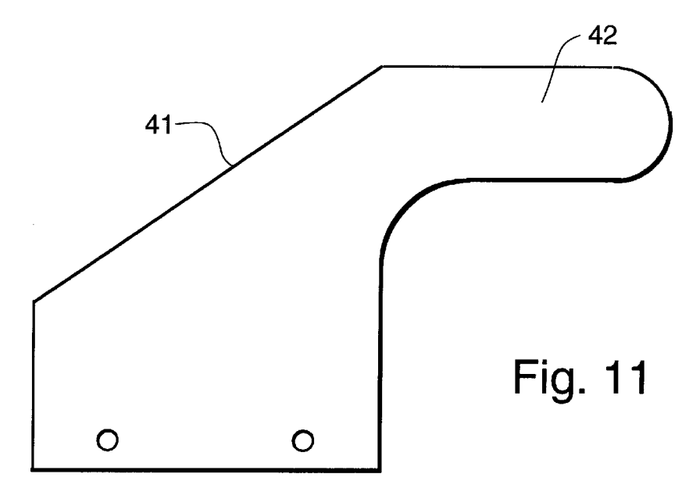
FIG. 11 is an enlarged top plan view of one half of the cutterbar guard.
Figure 12:
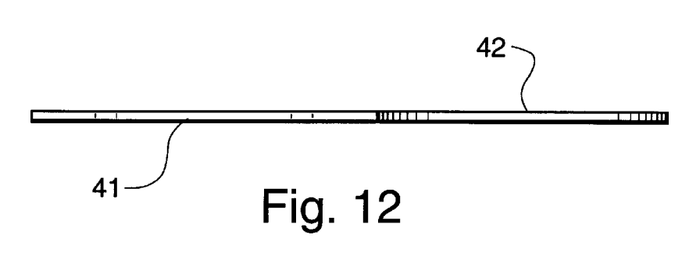
FIG. 12 is an elevational view of the cutterbar guard shown in FIG. 11.

The two guard pieces 41, 43 are formed with an "L-shape" and are installed such that the legs 42 of the L-shape overlap at the middle of the support frame 15 to form a continuous guard 40. The continuous configuration does not present a gap to catch viney crops, saplings, fence wire, etc. that can result in a deformation of or damage to the canopy support.

Figure 8:
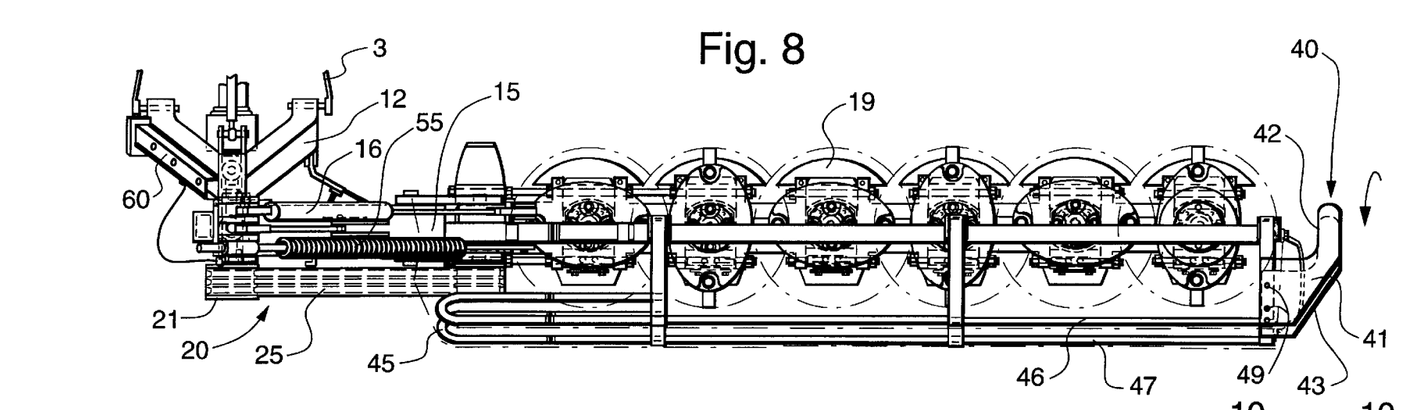
FIG. 8 is a top plan view of the disc mower similar to that of FIG. 1 but with the front part of the mower canopy folded back to permit access to the disc cutterbar.
Figure 9:
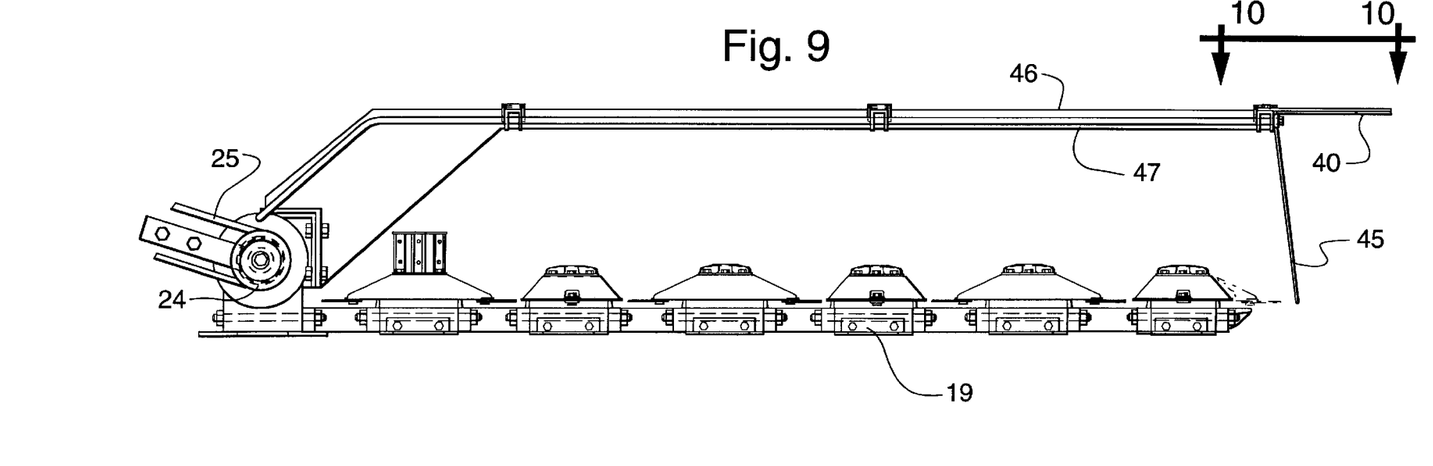
FIG. 9 is an enlarged rear elevational view of the disc mower corresponding to lines 9—9 of FIG. 1 to depict the disc cutterbar and canopy.
Figure 10:
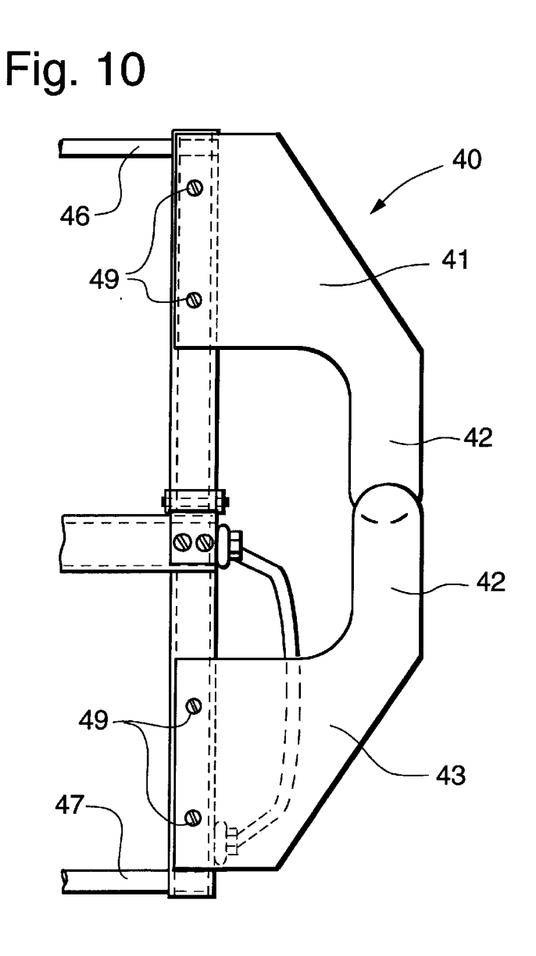
FIG. 10 is an enlarged top plan view of the distal end of the mower to depict the mounting of the cutterbar guard on the canopy support.

As best seen in FIGS. 8 and 10, the leg 42 of the front guard stamping 41 is positioned below the leg 42 of the rear guard stamping 43 so that when the front canopy support 46 is raised, the leg 42 of the front guard 41 pivots down and toward the front of the rear guard member 43. The front guard member 41 extends toward the front of the front canopy support 46 and beyond the front edge thereof where the canopy 45 is beveled inwardly. The leading edge 44 of the guard members 41, 43 act as a guide to deflect tall crops, saplings and fence wire, etc. away from the canopy support 46, 47 and the canopy 45 so that the canopy 45 and canopy support 46, 47 are not subjected to wear from the contact therewith. The front of the guard 40 is secured directly to the canopy support 46, 47 by fasteners 49 so that no gaps exist that could catch vines, etc. and pull the canopy 45 and support frame 15 rearwardly, with possible failure thereof.

As an alternative, the guards 41, 43 could be constructed from a pliable material which will allow some deformation upon impact by a substantial object, such as a sapling, and a subsequent return to its normal shape after engagement with the object has been eliminated.

Referring now to FIGS. 1–4 and 13–17, the details of the flotation mechanism can best bee seen. The flotation mechanism 50 suspends the support frame 15 from the base frame 13 and assists the pivotal movement thereof relative to the base frame 13. In the event the cutterbar 19 strikes an object on the ground G or follows ground undulations, the cutterbar 19 can move upwardly through a range of flotational movement, as shown in a comparison between the positions of FIGS. 13 and 14. The flotation mechanism 50 includes a flotation spring 55 interconnecting the gearbox 26, or some other remote part of the support frame 15, and the base frame 13. Preferably, the spring 55 is coupled to a rod 56 that passes through a collar 52 affixed to the base frame 13.

Figure 13:
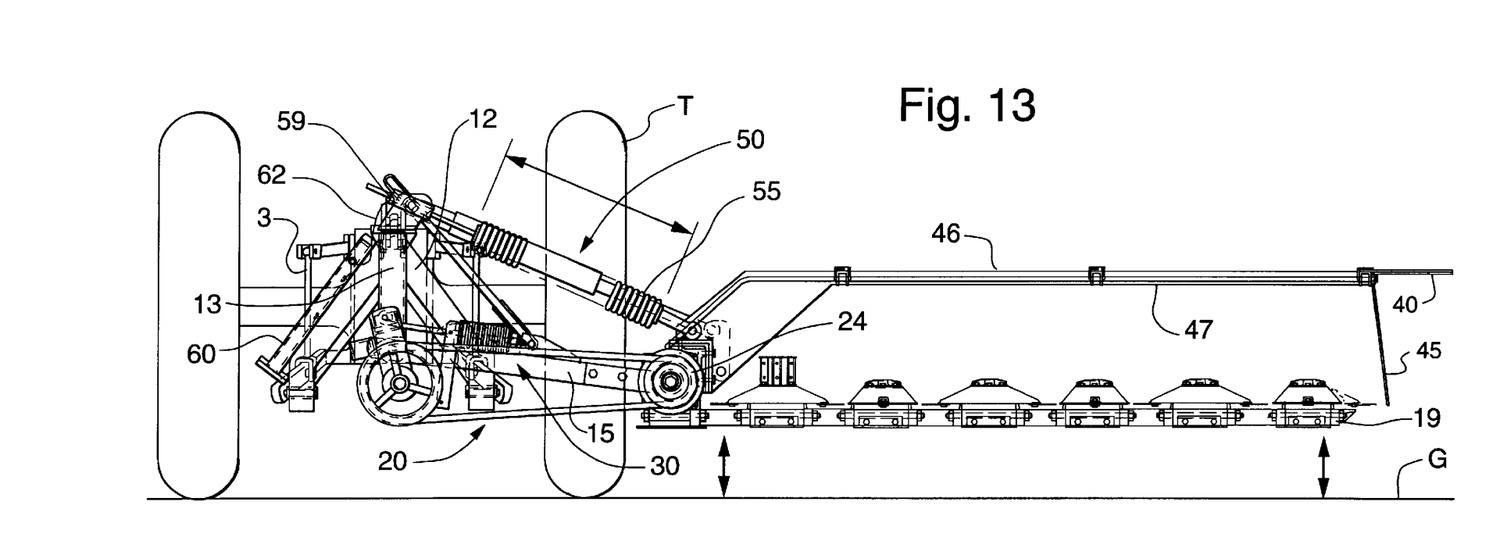
FIG. 13 is a rear elevational view of the disc mower shown in FIG. 1 with the disc cutterbar raised to the maximum upward flotational movement.
Figure 14:
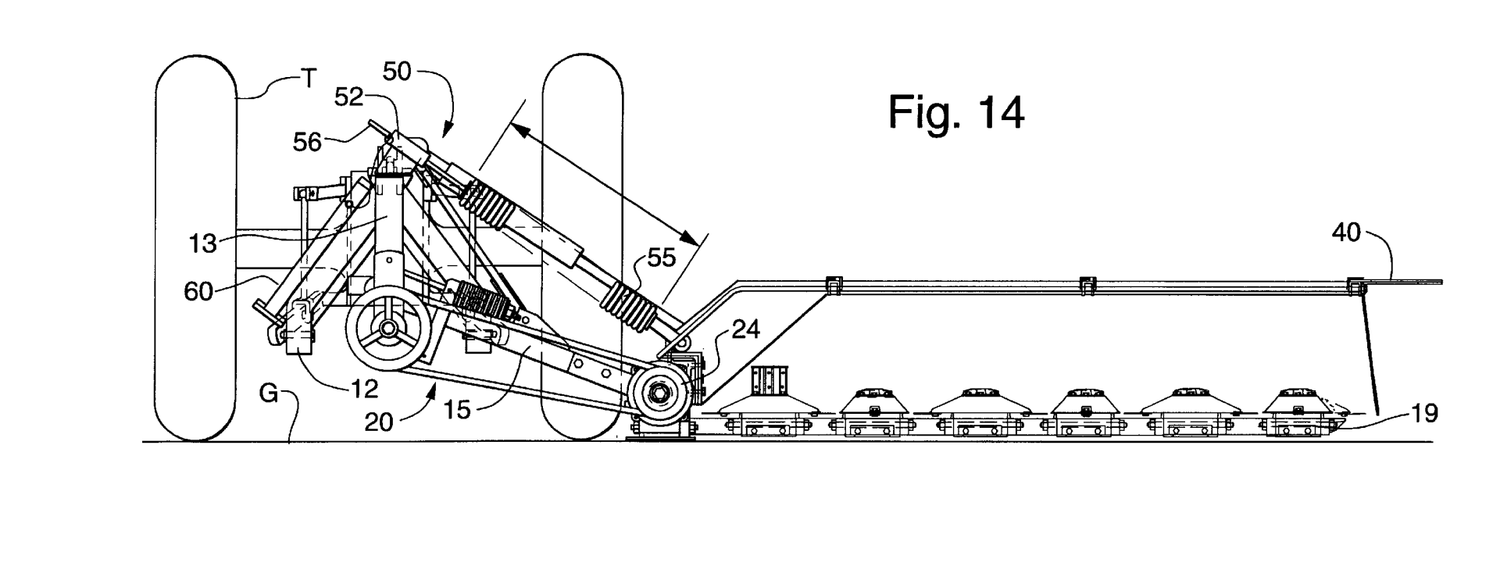
FIG. 14 is a rear elevational view similar to that of FIG. 13, but with the disc cutterbar lowered to the ground, which is the maximum downward flotational movement of the cutterbar.

An engagement pin 59 is engageable through a hole in the rod 56 to restrain the movement of the rod 56 through the collar 52 toward the cutterbar 19, although the rod 56 is free to pass through the collar 52 in the opposite direction. When engaged with the rod 56, the pin 59 forces an extension of the spring 55 to floatingly support the cutterbar 19 relative to the ground G. The cutterbar 19 is pivotally movable through operation of the hydraulic lift cylinder 16 interconnecting the base frame 13 and the support frame 15 to raise the cutterbar 19 into a substantially vertical orientation (not shown) for transport by pivoting the cutterbar 19 primarily about the axis corresponding to the shaft of the driven pulley 24 and partly about the pivotal connection between the base frame 13 and the support frame 15.

Figure 15:
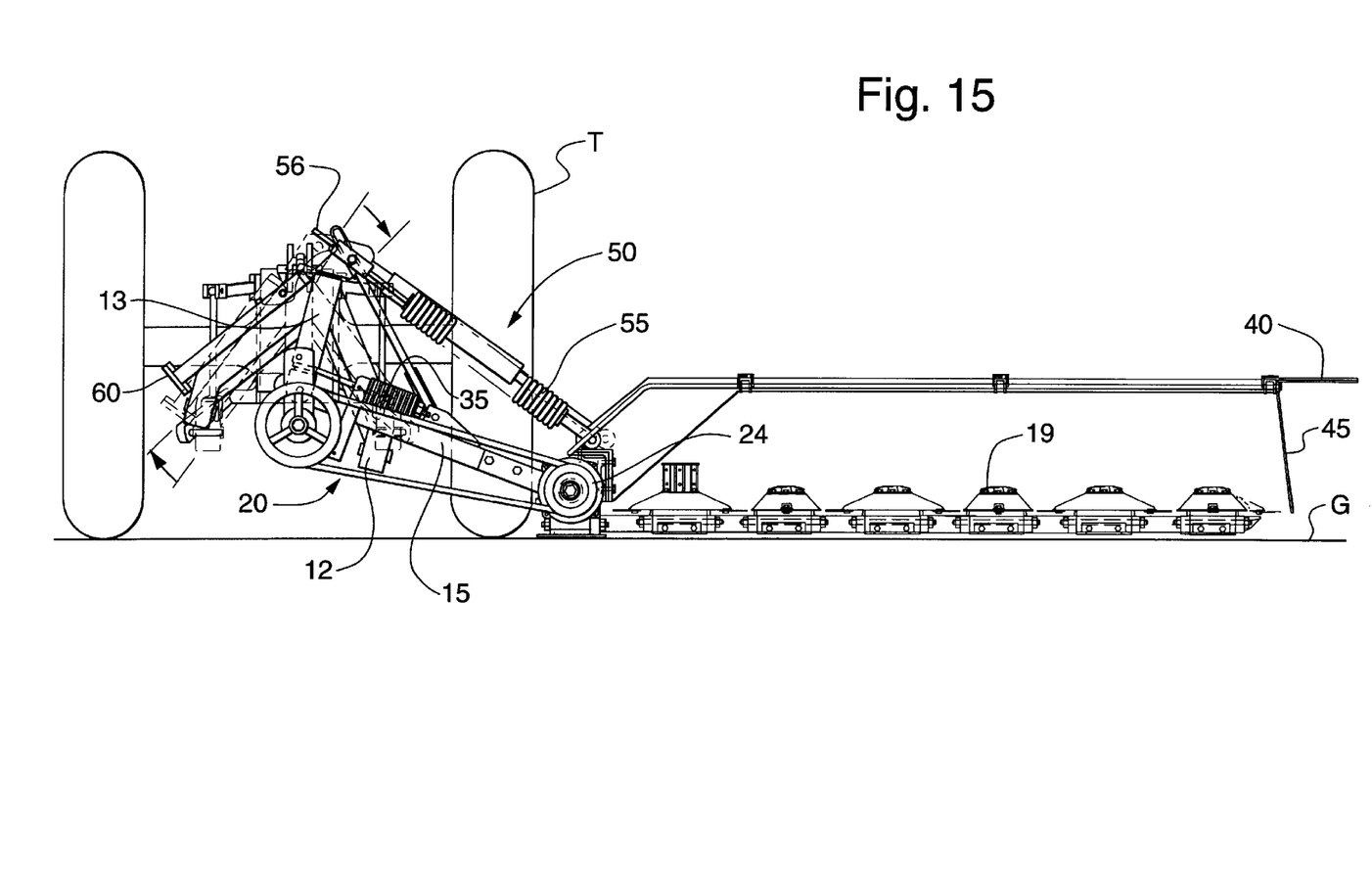
FIG. 15 is a rear elevational view of the disc mower shown in FIG. 14, the rotational movement of the mounting frame encountered by a failure to release the flotation spring force being shown in phantom.

The disc mower 10 is stored with the cutterbar 19 lying against the ground in the operative position, as shown in FIG. 15, with the base frame 13 support on a support jack 60. As depicted in FIG. 15, the weight of the cutterbar 19 is such that the disconnection of the mounting frame 12 from the tractor three-point hitch 3 will result in a sudden rotation of the mounting frame 12, as depicted in phantom in FIG. 15, due to the force exerted by the flotation spring 55. To prevent this sudden movement of the mounting frame 12, the flotation spring 55 must be released prior to the disconnection of the mounting frame 12 from the three-point hitch 3.

Figure 16:
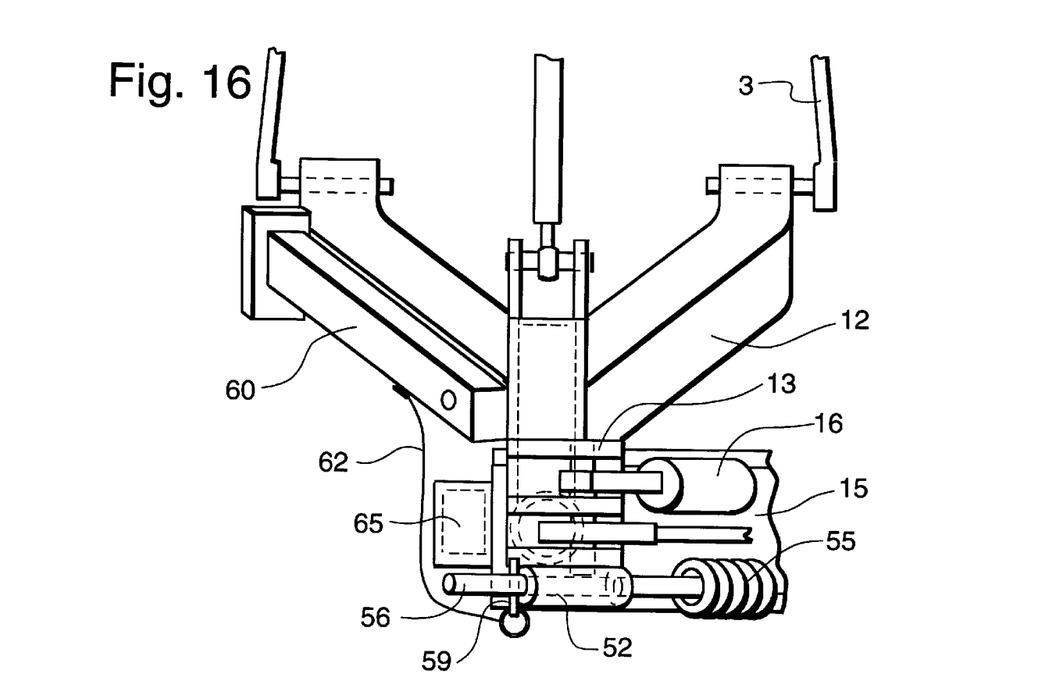
FIG. 16 is an enlarged partial top plan view of the mounting frame area of the disc mower to better show the anchor point for the flotation spring.
Figure 17:
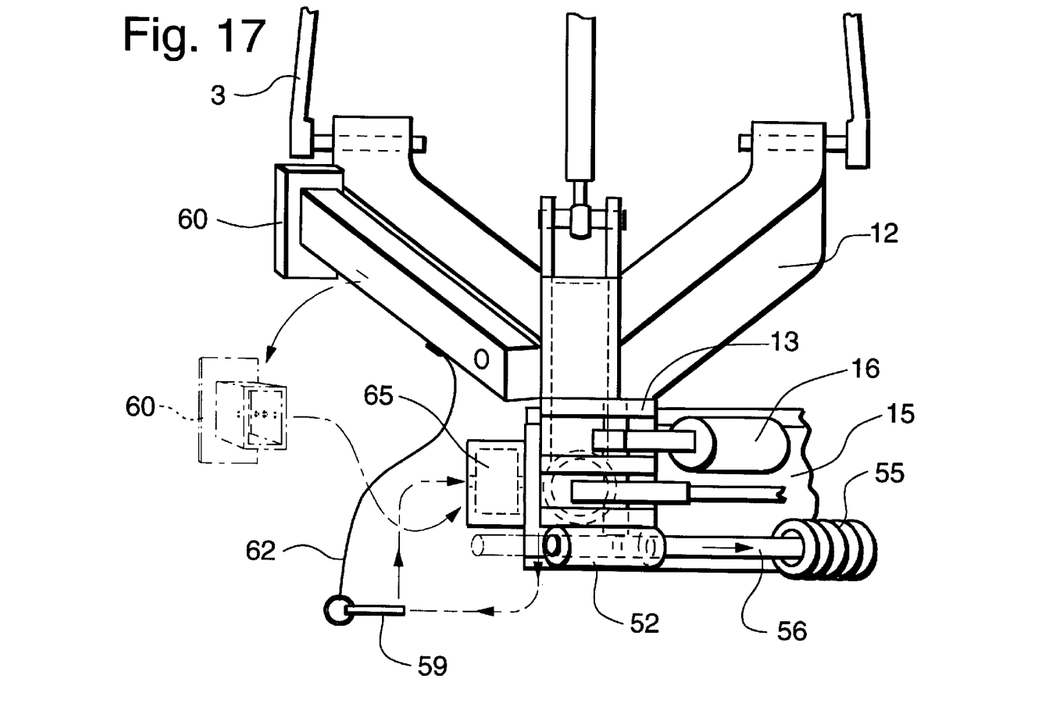
FIG. 17 is a top plan view similar to that of FIG. 16, but with the flotation spring released by the removal of the mounting pin to depict the subsequent mounting of the support jack in order to dis-mount the disc mower from the tractor three-point hitch.

To assure that the flotation spring 55 is released prior to disconnecting the mounting frame 12, the jack 60 is tethered to the engagement pin 59 by a cable 62 that is too short to allow the jack 60 to be connected to the base frame 13 in the operative position unless the engagement pin 59 is first removed from the rod 56. Once the pin 59 is removed, the jack 60 can be dismounted from the transport position on the mounting frame 12 and mounted on the mounting bracket 65 on the base frame 13 in the operative position to support the mower 10 above the ground G. The engagement pin 59 then serves its double duty by securing the jack 60 to the base frame 13. Since the engagement pin 59 has been removed from the rod 56, the rod 56 is free to slide through the collar 52 in either direction without engaging the force of the flotation spring 55.

To dismount the mower 10 from the tractor T, the operator must first raise the cutterbar 19 toward the vertical transport position to release the pressure on the flotation spring 55 and, thereby, preferably move the rod 56 upwardly through the collar 52, whereupon the pin 59 can be easily removed. Preferably, the rod 56 is provided with a detent mechanism (not shown) that will keep the pin 59 properly located in the rod 56 unless sufficient force is exerted to overcome the detent force. The detent mechanism will keep the pin 59 engaged with the rod 56 even when the cutterbar is raised to the substantially vertical transport position. The pin 59 is then removed from the rod 56 to release the flotation mechanism 50. The support jack 60 is then removed from its storage location on the mounting frame 12 and installed on the mounting bracket 65 on the base frame 13. The pin 59 is then installed to fasten the jack 60 to the mounting bracket 65.

Since the flotation spring force is released, the cutterbar 19 is then lowered to the ground G with no flotation support from the spring 55, the rod 56 sliding through the collar 52. The mower 10 is then resting on the jack 60 and the lowered cutterbar 19. The mounting frame 12 can then be released from the three-point hitch 3 and the mower 10 removed from the tractor T. Re-mounting the mower 10 to the tractor T is accomplished by reversing the above procedure.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a mower supportable from a prime mover and operably connectable to said prime mover to receive operative power therefrom, said mower having a frame; a cutterbar pivotally supported from said frame for movement between a raised transport position and a lowered operative position; a drive mechanism supported from said frame to receive rotational power from said prime mover and transfer the rotational power to said cutterbar for operably driving said cutterbar, said drive mechanism including a belt assembly having a drive belt entrained around a drive pulley and a driven pulley to transfer rotational power therebetween; and a tensioning mechanism operably associated with said belt assembly to maintain tension in said drive belt, the improvement comprising:

an arm pivotally supported from said frame and rotatably supporting one of said drive pulley and said driven pulley, said arm being biased to move said one pulley to exert tension into said drive belt by a spring assembly; and an indicator adjacent said spring assembly to measure the force exerted by said spring assembly.

2. The mower of claim 1 wherein said spring assembly includes a spring having a length variable with the force exerted by said spring, said spring being anchored to said frame, said indicator including a bracket positioned adjacent said spring and having a length substantially equal to the length of said spring required for exerting the proper spring force for tensioning said drive belt.

3. In a belt tensioning mechanism for an agricultural mower supportable from and being operably connected to a prime mover to receive operative power therefrom, said mower having a frame; a cutterbar pivotally supported from said frame for movement between a raised transport position and a lowered operative position; a drive mechanism supported from said frame to receive rotational power from said prime mover and transfer the rotational power to said cutterbar for operably driving said cutterbar, said drive mechanism including a belt assembly having a drive belt entrained around a drive pulley and a driven pulley to transfer rotational power therebetween; said tensioning mechanism including a spring operably associated with said belt assembly to maintain tension in said drive belt, the improvement comprising:

an indicator bracket mounted adjacent said spring and having a length corresponding to a recommended spring length for proper tensioning of said drive belt, said spring being adjustable in length to match said indicator bracket length.

4. The belt tensioning mechanism of claim 3 wherein said spring has a fixed end mounted against a fixed support and a movable end selectively adjustable to vary the length of said spring and thereby vary the tensioning in said drive belt, said indicator bracket being mounted to said fixed support.

5. The belt tensioning mechanism of claim 4 wherein said indicator bracket is mounted to extend along the length of said spring to indicate that said spring is adjusted for said proper tensioning of said drive belt when said movable end of said spring is even with a terminal end of said indicator bracket.

6. The belt tensioning mechanism of claim 5 wherein said spring is operably associated with an arm pivotally supported from said frame and rotatably supporting one of said drive pulley and said driven pulley, said arm being biased by said spring to move said one pulley to exert tension into said drive belt.

* * * * *